(12) United States Patent
Larsen

(10) Patent No.: US 10,617,100 B1
(45) Date of Patent: Apr. 14, 2020

(54) WATERING STATION FOR INSECTS

(71) Applicant: Dylan Patrick Larsen, Marysville, WA (US)

(72) Inventor: Dylan Patrick Larsen, Marysville, WA (US)

( * ) Notice: Subject to any disclaimer, the term of this patent is extended or adjusted under 35 U.S.C. 154(b) by 0 days.

(21) Appl. No.: 15/637,855

(22) Filed: Jun. 29, 2017

Related U.S. Application Data

(60) Provisional application No. 62/413,908, filed on Oct. 27, 2016.

(51) Int. Cl.
| | | |
|---|---|---|
| *A01K 53/00* | (2006.01) | |
| *B65D 25/28* | (2006.01) | |
| *A01K 39/02* | (2006.01) | |
| *A01K 39/026* | (2006.01) | |

(52) U.S. Cl.
CPC .......... *A01K 53/00* (2013.01); *B65D 25/2802* (2013.01); *A01K 39/02* (2013.01); *A01K 39/026* (2013.01)

(58) Field of Classification Search
CPC .. A01K 53/00; A01K 39/0206; A01K 39/012; A01K 39/026; A01K 39/02; B65D 25/2802
See application file for complete search history.

(56) References Cited

U.S. PATENT DOCUMENTS

| | | | | |
|---|---|---|---|---|
| 24,516 A | * | 6/1859 | Brown | A01K 53/00 449/10 |
| 804,271 A | * | 11/1905 | Schoning | A01K 53/00 119/475 |
| 1,056,266 A | * | 3/1913 | Danzenbaker | A01K 53/00 449/10 |
| 1,108,277 A | * | 8/1914 | Thale | A01K 53/00 449/10 |
| 1,414,284 A | * | 4/1922 | Jones | A01K 53/00 449/23 |
| 1,426,701 A | * | 8/1922 | Achenbach | A01K 53/00 449/10 |
| 1,566,571 A | * | 12/1925 | Appleton | A01K 39/026 119/77 |
| 1,801,932 A | * | 4/1931 | Miller | A01K 39/026 119/77 |

(Continued)

FOREIGN PATENT DOCUMENTS

FR 434427 A * 2/1912 ............. A01K 53/00

*Primary Examiner* — Joshua D Huson
(74) *Attorney, Agent, or Firm* — Plager Schack LLP; Mark H. Plager; Michael J. O'Brien

(57) ABSTRACT

A watering system is configured to supply water to insects without the insects drowning. The watering system has a base portion with a base lip which is attached to all distal edges of a pan. An overflow channel is arranged next to the pan and through the base lip. A flow path is arranged in the base portion and further has a lip with a fluid pathway. A retainer ring is installed into the flow path immediately adjacent to the lip. The retainer ring has a retainer ring fluid pathway. The fluid pathway is aligned with the retainer ring fluid pathway. The pan is attached to raised sections with channels therebetween. Fluid that is inserted through the retainer ring flows through the fills the fluid pathway and the retainer ring fluid pathway, before filling the channels, and then spilling out of the overflow channel.

3 Claims, 4 Drawing Sheets

(56) References Cited

U.S. PATENT DOCUMENTS

| | | | | | |
|---|---|---|---|---|---|
| 2,492,468 | A | * | 12/1949 | Durben | A01K 53/00 449/9 |
| 5,353,742 | A | * | 10/1994 | Mauritz | A01K 39/02 119/52.2 |
| 5,423,291 | A | * | 6/1995 | Daugherty | A01K 39/012 119/52.2 |
| D368,336 | S | * | 3/1996 | Brown | D30/121 |
| 6,640,745 | B1 | * | 11/2003 | Park | A01K 39/012 119/52.2 |
| D606,709 | S | * | 12/2009 | McMullen | D30/127 |
| 8,011,323 | B2 | * | 9/2011 | Vaughn, Jr. | A01K 39/02 119/72 |
| 8,028,658 | B2 | * | 10/2011 | Stone | A01K 39/0206 119/52.2 |
| 8,201,519 | B2 | * | 6/2012 | Humphries | A01K 39/0206 119/51.5 |
| 8,347,818 | B2 | * | 1/2013 | Cowger | A01K 39/0206 119/72 |
| D814,715 | S | * | 4/2018 | Fox | D30/124 |
| D821,660 | S | * | 6/2018 | Nifong | D30/124 |
| 2006/0037546 | A1 | * | 2/2006 | Jung | A01K 39/012 119/72 |
| 2009/0260576 | A1 | * | 10/2009 | Vosbikian | A01K 39/012 119/52.2 |
| 2010/0229801 | A1 | * | 9/2010 | Stone | A01K 39/02 119/74 |
| 2011/0094449 | A1 | * | 4/2011 | George | A01K 39/012 119/61.1 |
| 2014/0109835 | A1 | * | 4/2014 | Colvin | A01K 39/0206 119/74 |
| 2014/0158056 | A1 | * | 6/2014 | Vaughn, Jr. | A01K 39/0206 119/72 |
| 2015/0013612 | A1 | * | 1/2015 | Humphries | A01K 39/0206 119/51.5 |
| 2015/0020742 | A1 | * | 1/2015 | Faunce | A01K 39/0206 119/78 |
| 2015/0122184 | A1 | * | 5/2015 | Donegan | A01K 39/0113 119/51.01 |
| 2017/0036921 | A1 | * | 2/2017 | Ouellette | A01K 53/00 |
| 2017/0273280 | A1 | * | 9/2017 | Cruz | A01K 39/02 |
| 2018/0084763 | A1 | * | 3/2018 | Solano | A01K 53/00 |

\* cited by examiner

WATERING STATION FOR INSECTS

RELATED APPLICATION

This application claims priority to provisional U.S. patent application Ser. No. 62/413,908 filed on Oct. 27, 2016, the entire contents of which is herein incorporated by reference.

BACKGROUND

The embodiments herein relate generally to a watering device for honeybees to hydrate them that in turn increases honey production as well pollination by bees.

Prior to embodiments of the disclosed the watering devices did not contain a landing step for bees that led to drowning of the bees. Embodiments of the disclosed invention solve this problem.

SUMMARY

A watering system is configured to supply water to insects without the insects drowning. The watering system includes a base portion that further comprises a base lip which is attached to all distal edges of a pan. An overflow channel is arranged next to the pan and through the base lip. A flow path is arranged in the base portion and further comprising a lip. The lip further comprises at least one fluid pathway. A retainer ring is installed into the flow path immediately adjacent to the lip. The retainer ring further comprises at least one retainer ring fluid pathway. The at least one fluid pathway is aligned with the at least one retainer ring fluid pathway. A plurality of raised sections with a plurality of channels therebetween are both mechanically coupled to the pan. Fluid that is inserted through the retainer ring flows through the fills the at least one fluid pathway and the at least one retainer ring fluid pathway, before filling the plurality of channels, and then spills out of the overflow channel.

In some embodiments, the flow path can further comprise a first fluid pathway, a second fluid pathway, a third fluid pathway, and a fourth fluid pathway. The retainer ring can further comprise a first retainer ring fluid pathway, a second retainer ring fluid pathway, a third retainer ring fluid pathway, and a fourth retainer ring fluid pathway. The first fluid pathway can be aligned with the first retainer ring fluid pathway. The second fluid pathway can be aligned with the second retainer ring fluid pathway. The third fluid pathway can be aligned with the third retainer ring fluid pathway. The fourth fluid pathway can be aligned with the fourth retainer ring fluid pathway.

In some embodiments, a threaded ring is mechanically coupled to the lip. A fluid vessel is mechanically coupled to vessel threads and a handle. The fluid vessel is detachably coupled to the base portion by mating the vessel threads with the threaded ring.

BRIEF DESCRIPTION OF THE FIGURES

The detailed description of some embodiments of the invention is made below with reference to the accompanying figures, wherein like numerals represent corresponding parts of the figures.

DETAILED DESCRIPTION OF CERTAIN EMBODIMENTS

Figure 1:
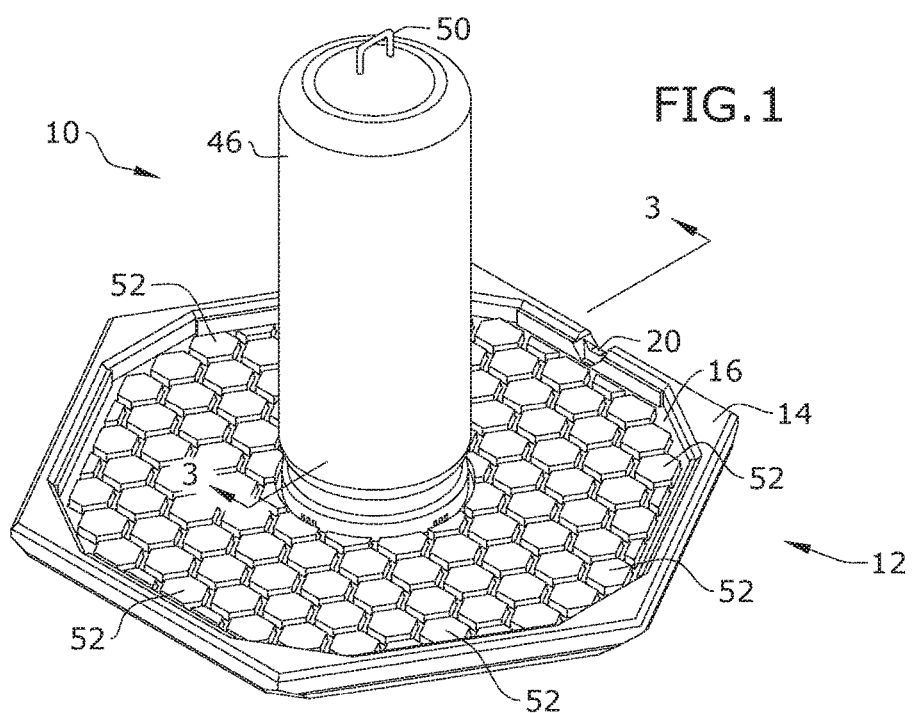
FIG. 1 shows a perspective view of one embodiment of the present invention.
Figure 5:
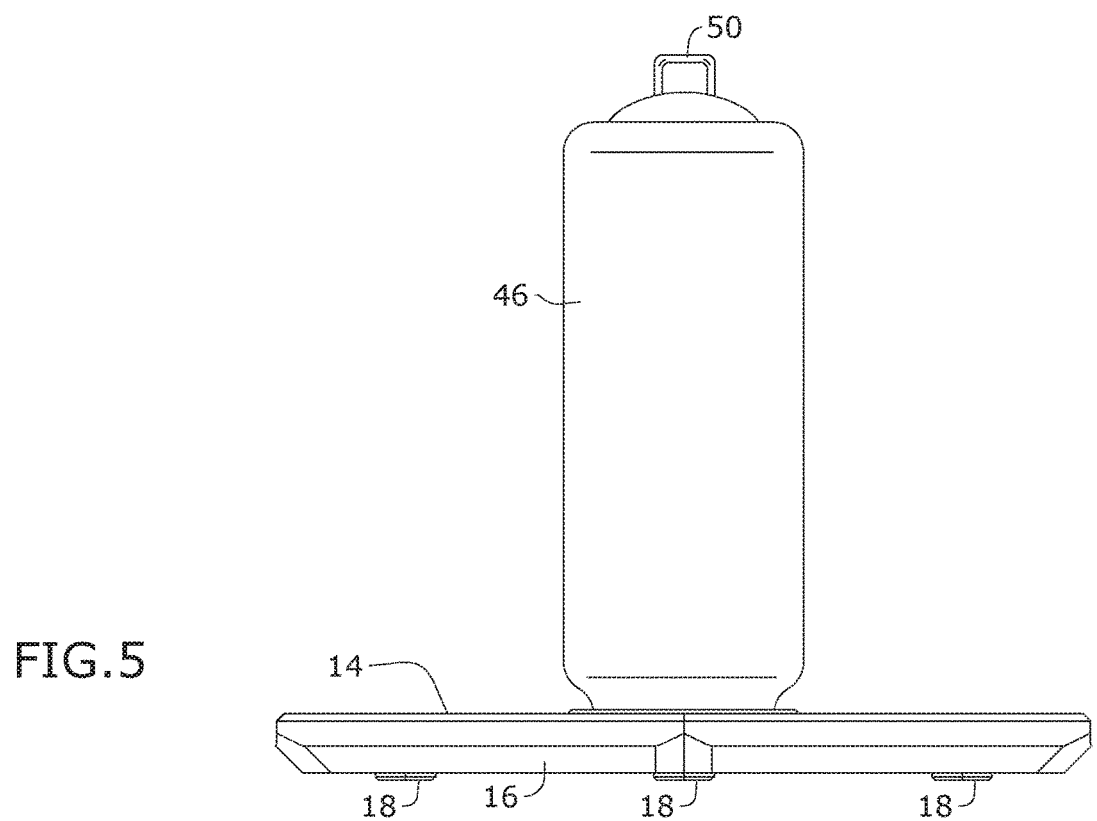
FIG. 5 shows a front view of one embodiment of the present invention.
Figure 2:
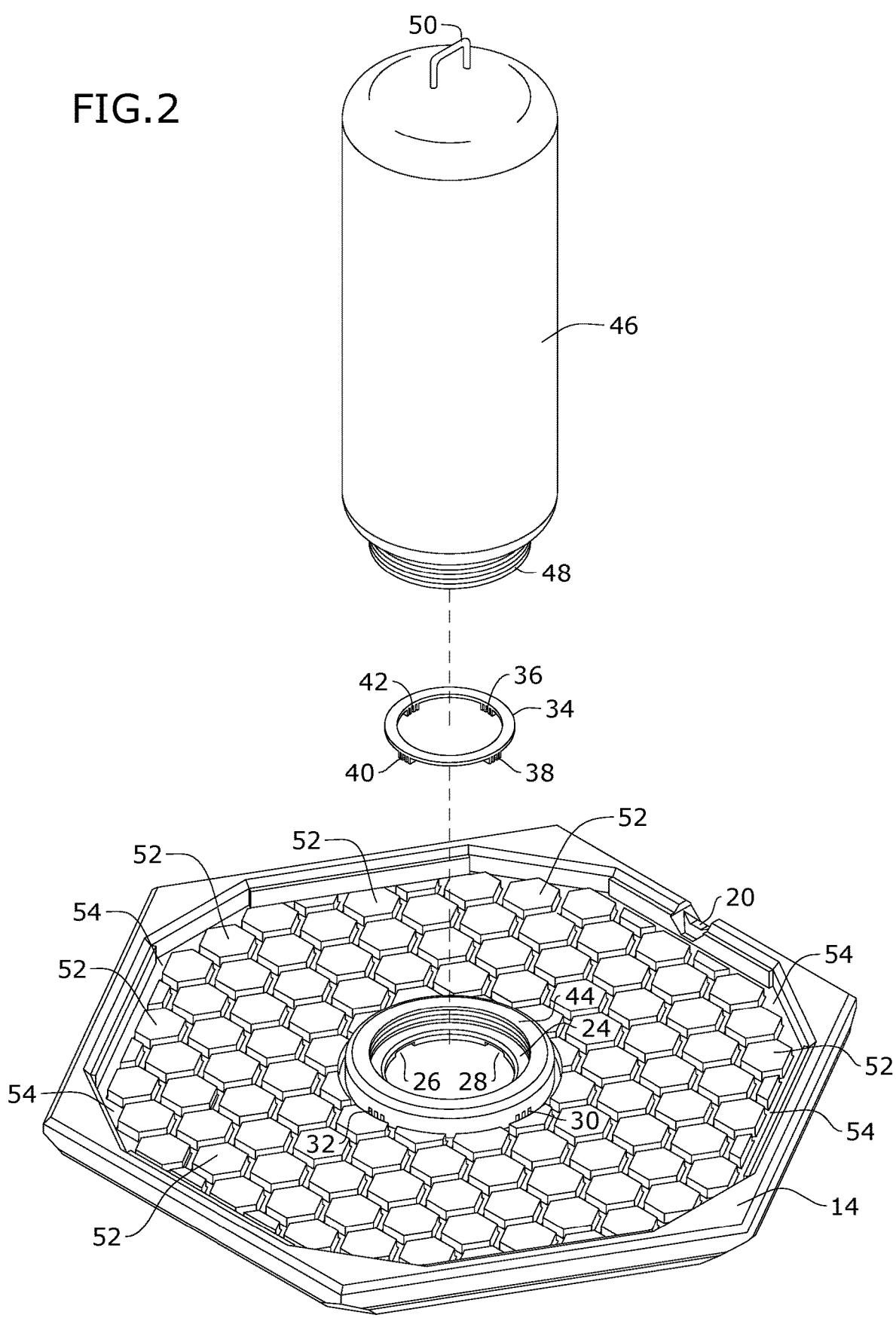
FIG. 2 shows an assembly view of one embodiment of the present invention.

By way of example, and referring to FIGS. 1-5, one embodiment of a watering system 10 further comprises a base portion 12. The base portion 12 further comprises a base lip 14 which is attached to all distal edges of a pan 16. The base lip 14 and a bottom side of the pan 16 are mechanically coupled to a plurality of base feet 18 which lift the bottom side from a ground surface. An overflow channel 20 exists next to the pan 16 through the base lip 14.

The pan 16 further comprises a flow path 22. The flow path 22 further comprises a lip 24, a first fluid pathway 26, a second fluid pathway 28, a third fluid pathway 30 and a fourth fluid pathway 32. A retainer ring 34 further comprises a first retainer ring fluid pathway 36, a second retainer ring fluid pathway 38, a third retainer ring fluid pathway 40, and a fourth retainer ring fluid pathway 42. The retainer ring 34 is installed into the flow path 22 immediately adjacent to the lip 24. This installation is such that the first fluid pathway 26 is aligned with the first retainer ring fluid pathway 36. The second fluid pathway 28 is aligned with the second retainer ring fluid pathway 38. The third fluid pathway 30 is aligned with the third retainer ring fluid pathway 40. The fourth fluid pathway 32 is aligned with the fourth retainer ring fluid pathway 42. It is noteworthy, that the fluid pathways are also flow restrictors that permit fluid to pass with some resistance.

The lip 24 is mechanically coupled to a threaded ring 44. A fluid vessel 46 is mechanically coupled to vessel threads 48 and a handle 50. The fluid vessel 46 can be mechanically coupled to the base portion 12 by mating the vessel threads 48 with the threaded ring 44. This can be done, among other ways, by twisting the handle 50.

The threaded ring 44 is surrounded by a plurality of raised sections 52 with a plurality of channels 54 therebetween. One purpose of watering system 10 is to enable bees to stand on a raised section 54 and drink the shallow water over the raised section or in a nearby channel 54. For this to work without the bee drowning, water or fluid 56 needs to be at a low and manageable level.

Figure 3:
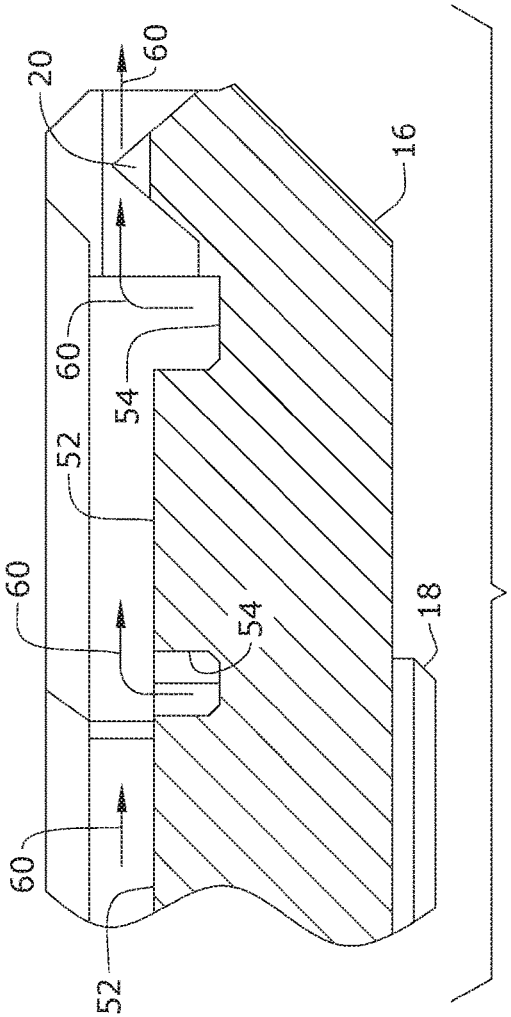
FIG. 3 shows a section view of one embodiment of the present invention taken along line 3-3 in FIG. 1.
Figure 4:
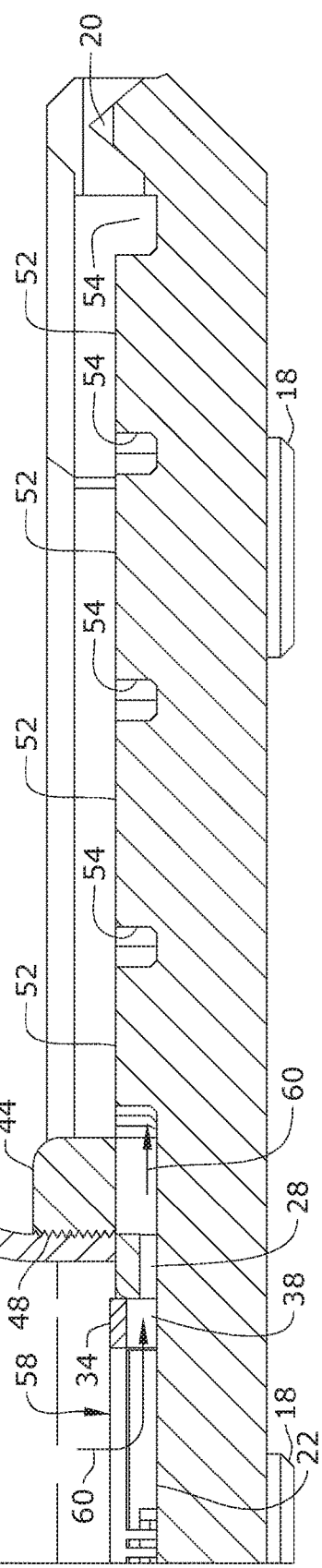
FIG. 4 shows a detail section view of one embodiment of the present invention.
Figure 6:
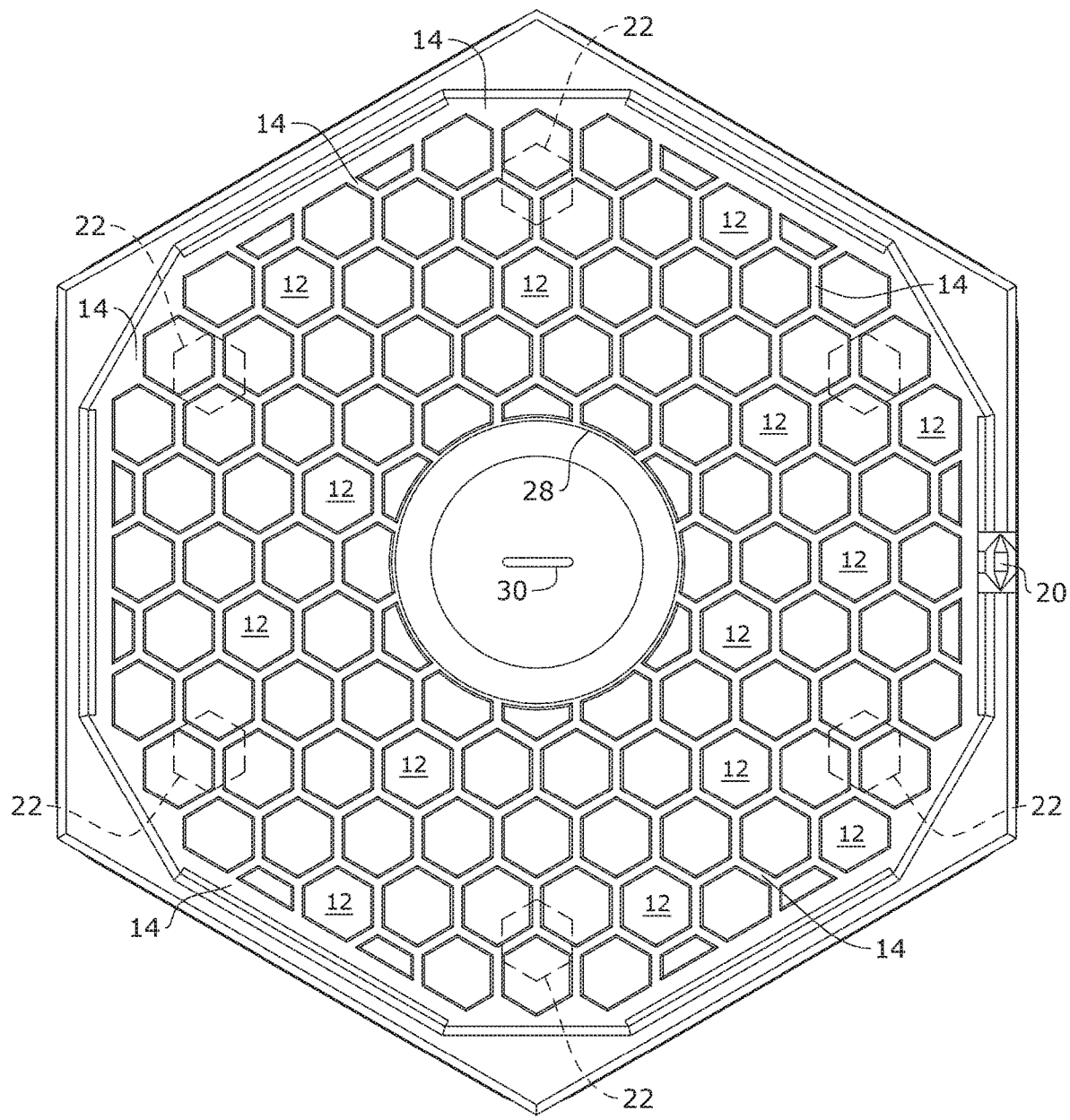
FIG. 6 shows a top view of one embodiment of the present invention.

FIG. 3 offers one solution to this problem. The fluid 56 in the fluid vessel 46 travels through a fluid vessel opening 58 outward in a fluid direction 60. The fluid 56 passes through the second retainer ring fluid pathway 38 and the second fluid pathway 28 before being exposed to the plurality of channels 54 and the plurality of raised sections 52.

At this point the fluid direction 60, directs the fluid 56 into the plurality of channels 54 and the plurality of raised sections 52. However, the depth of the fluid 56 is minimal because excess fluid 56 travels out of the pan 16 through the overflow channel 20.

At first, it would appear that hydrostatics would indicate the fluid 56 would drain entirely from the fluid vessel 46. However, this is not so. The fluid 56 is only released until there are no air gaps left between the fluid vessel 46 and the plurality of channels 54. As water dries, the air gaps return and fluid drains accordingly. The second retainer ring fluid pathway 38 and the second fluid pathway 28 can be adjusted such that a depth of water over the plurality of raised sections 52 is less than one millimeter. Plant watering spikes and globes operate under similar principles.

As used in this application, the term "a" or "an" means "at least one" or "one or more."

As used in this application, the term "about" or "approximately" refers to a range of values within plus or minus 10% of the specified number.

As used in this application, the term "substantially" means that the actual value is within about 10% of the actual desired value, particularly within about 5% of the actual desired value and especially within about 1% of the actual desired value of any variable, element or limit set forth herein.

All references throughout this application, for example patent documents including issued or granted patents or equivalents, patent application publications, and non-patent literature documents or other source material, are hereby incorporated by reference herein in their entireties, as though individually incorporated by reference, to the extent each reference is at least partially not inconsistent with the disclosure in the present application (for example, a reference that is partially inconsistent is incorporated by reference except for the partially inconsistent portion of the reference).

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

Any element in a claim that does not explicitly state "means for" performing a specified function, or "step for" performing a specified function, is not to be interpreted as a "means" or "step" clause as specified in 35 U.S.C. § 112, ¶6. In particular, any use of "step of" in the claims is not intended to invoke the provision of 35 U.S.C. § 112, ¶6.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A watering system, configured to supply water to insects without the insects drowning; the watering system comprising:
    a fluid vessel comprising a reservoir for holding and storing a liquid and an opening for dispensing liquid therefrom, wherein said fluid vessel has vessel threads mechanically coupled and adjacent to said opening;
    a base portion, and further comprising a base lip which is attached to all distal edges of a pan, said base portion further comprising:
        a plurality of raised sections with a plurality of channels therebetween, mechanically coupled to the pan defining a grid arrangement;
        an overflow channel, arranged next to the pan and through the base lip; wherein a lower edge of the overflow channel is arranged at a height above the bottom of the plurality of channels and below an upper edge of the base lip; tapered edges of the overflow channel extend above an upper surface of the plurality of raised sections and below the upper edge of the base lip;
        a flow path, arranged in the base portion and further comprising a lip with a mechanically coupled threaded ring, wherein the lip further comprises at least one fluid pathway; and
        a retainer ring, detachably placed upon the flow path immediately adjacent to the lip, wherein the retainer ring further comprises at least one retainer ring fluid pathway; wherein the at least one fluid pathway is aligned with the at least one retainer ring fluid pathway;
    wherein said fluid vessel opening is mated to the base portion by mating said vessel threads to said threaded ring; and,
    wherein fluid within the fluid vessel is dispensed from said reservoir, through said opening and through the retainer ring, flowing through the at least one retainer ring fluid pathway and the at least one fluid pathway of said flow path, before filling the plurality of channels, and then spills out of the overflow channel.

2. The watering system of claim 1,
    wherein the flow path further comprises a first fluid pathway, a second fluid pathway, a third fluid pathway, and a fourth fluid pathway;
    wherein the retainer ring further comprises a first retainer ring fluid pathway, a second retainer ring fluid pathway, a third retainer ring fluid pathway, and a fourth retainer ring fluid pathway
    wherein the first fluid pathway is aligned with the first retainer ring fluid pathway;
    wherein the second fluid pathway is aligned with the second retainer ring fluid pathway;
    wherein the third fluid pathway is aligned with the third retainer ring fluid pathway; and
    wherein the fourth fluid pathway is aligned with the fourth retainer ring fluid pathway.

3. The watering system of claim 1, wherein the base portion is configured for placement on a flat surface.

* * * * *